May 10, 1966    R. J. PIOCH    3,250,414
COMPACTING SYSTEM AND APPARATUS
Filed July 12, 1963    10 Sheets-Sheet 1

INVENTOR.
Robert J. Pioch
BY
Harness, Dickey & Pierce
ATTORNEYS

May 10, 1966 R. J. PIOCH 3,250,414
COMPACTING SYSTEM AND APPARATUS
Filed July 12, 1963 10 Sheets-Sheet 9

INVENTOR.
Robert J. Pioch.
BY
Harness, Dickey & Pierce
ATTORNEYS

United States Patent Office 3,250,414
Patented May 10, 1966

3,250,414
COMPACTING SYSTEM AND APPARATUS
Robert J. Pioch, Jackson, Mich.
Filed July 12, 1963, Ser. No. 294,607
16 Claims. (Cl. 214—302)

The present invention relates to methods and apparatus for compacting and handling waste material and the like, and particularly to improved means for receiving, compacting and facilitating the conveyance and disposal of such material. My invention comprises an improved arrangement of parts including a compacting unit adapted for stationary location at a fixed position, a transportable container into which the material to be compacted is rammed under high pressure, improved operating and loading means for the compacting unit, and improved means for releasablby connecting the compacting unit to the transportable container.

Further objects include the provision of improved means for closing the transportable container, for maintaining the compacted load under pressure and for detaching the loaded container from the compacting means.

Still further objects comprise the provision of improved means for handling and dumping loaded collection carts at the compacting unit, improved means whereby the load may be effectively rammed into the transportable container through one end under high pressure, yet is easily dumped without the provision of special ejecting means for forcing the compacted load from the container, and the provision of improved safety features for the protection of both the operating personnel and the apparatus.

Other objects and advantages will become apparent upon consideration of the present disclosure in its entirety.

In the drawing:

FIGURE 3 is a side elevational view on a larger scale, showing the compacting unit and the rear portion of the transportable container;

FIGURE 3A is a sectional detail taken substantially on the line IIIA—IIIA of FIGURE 3 and looking in the direction of the arrows;

FIGURE 9 is a fragmentary perspective view of a portion of one side of the compacting unit showing, in displaced relation, a dual access cover assembly for the load retention bar installation ports;

FIGURES 13 and 14 are views similar ot FIGURE 11 showing successive stages in the operation of the dumping mechanism;

FIGURE 16 is an elevational view of the electrical control panel, and

Referring now to the drawing, my improved apparatus includes a transportable container or receptacle, generally designated R, and a compacting unit, generally designated C. I preferably construct the receptacle of such size, weight and overall dimensions as to constitute, when filled with a compacted load, a full cargo for a tractor-trailer assembly or truck.

Figures 1, 2:
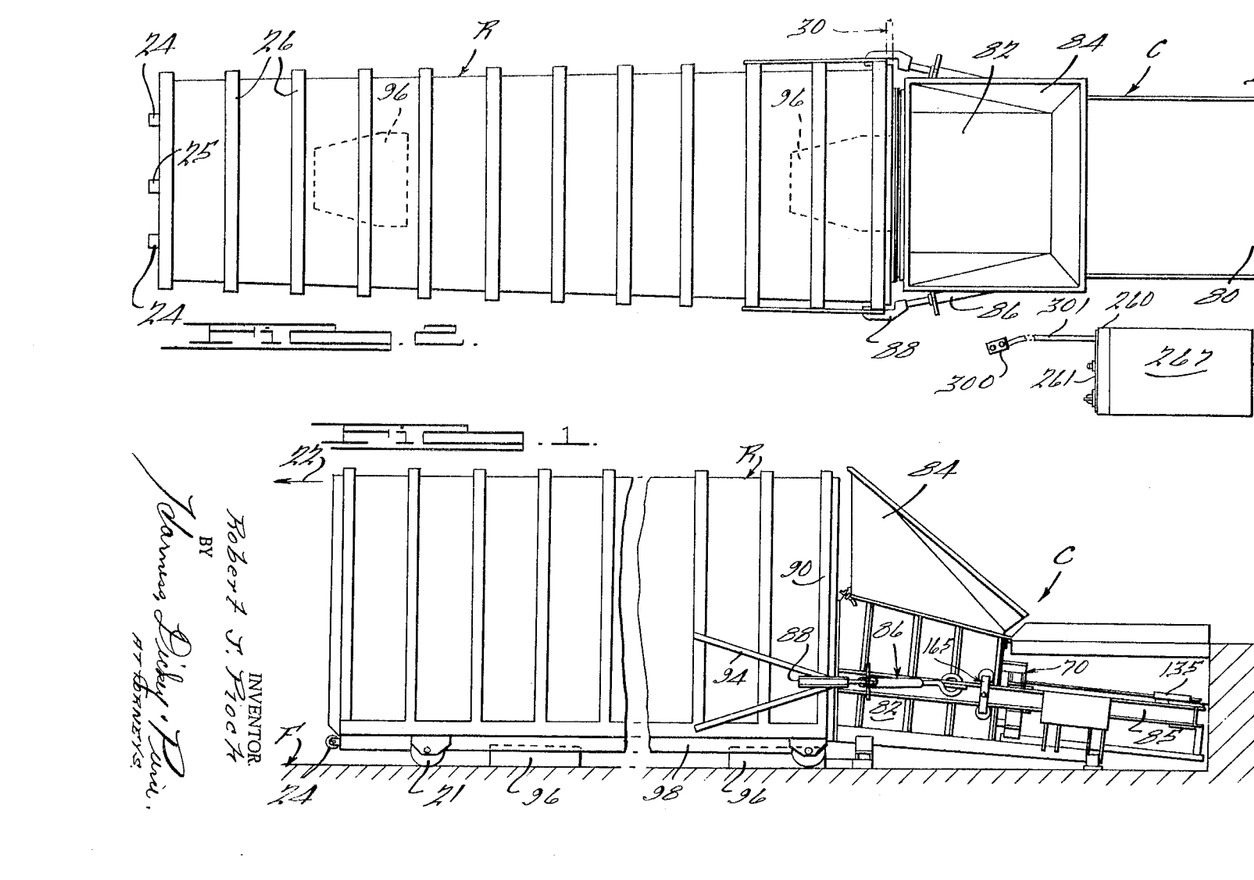
FIGURE 1 is a fragmentary side elevational view of apparatus embodying and arranged for the practice of my invention, the transportable container being partially broken away and an environmental area being diagrammatically indicated.
FIGURE 2 is a top plan view of the apparatus, with some parts also shown somewhat diagrammatically.
Figure 4:
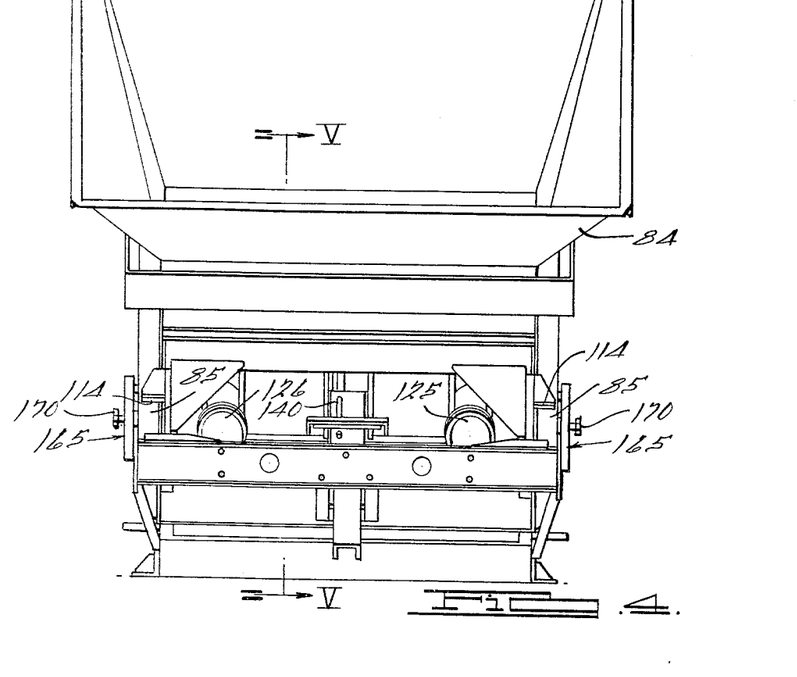
FIGURE 4 is a rear elevational view of the compacting unit.

The receptacle is provided with small heavily constructed wheels 21, 22 by which it may be rolled onto a tilt-bed truck or other suitable conveyance. It will be understood that the container may be used with any conventional or suitable trailer or truck having a ramp and winch, or a tilting bed or frame, which may be tipped to an inclined position against the ground, together with a winch or means to permit the receptacle to be hauled forwardly onto the conveyance (in the direction indicated by the arrow 22 of FIGURE 1). As shown in plan in FIGURE 2, the receptacle is narrower at the front than the rear and has a uniform gradual taper. The receptacle is closed at its forward end and on the top, bottom and sides, and is suitably reinforced to stand the expansive pressure caused by the compacting of the load. Reinforcing ribs are indicated at 26, 27. It will be appreciated that such structural details are not per se within the scope of my present invention and may be arranged in accordance with the preferences of the designer and the dimensions of the receptacle. All of the internal walls, however, are preferably smooth and flat so that the load may slide readily during insertion and removal. Sheet steel of course, is a suitable material for the construction of such walls. Although the side walls diverge uniformly toward the rear of the receptacle, the top and bottom walls may be substantially parallel, as shown in FIGURE 1.

The rear of the receptacle is provided with a door, generally designated 30, hinged as indicated at 32 at one vertical side of the rear opening. The rear opening is entirely unobstructed for its full height and width when the door is open. The door is also suitably reinforced against bulging as indicated generally at 33, and is adapted to be secured in closed position by fastening means shown as comprising draw bolts 35 supported upon the side wall of the receptacle for longitudinal sliding movement and projectable to the rear thereof. The bolts are simultaneously actuatable by means of a rockable bar 36 operable by a handle 38 rigidly secured to the bar. Arms 40 secured to and rockable with the bar 36 are connected by link means 42 to the bolts 35 to move the latter longitudinally of the receptacle when the bar is rocked by means of the handle. The bolts 35 are slidable through guide portions 44, and when moved all the way to rear so as to overhang the rear opening of the receptacle, are also free for limited rocking movement transversely of the receptacle. The rear ends of the bolts are provided with hook-like portions at their rear extremities facing inwardly toward the opening and adapted by such transverse rocking movement to move into and out of over-engaging relation with respect to keeper portions 48 on the free edge on the door. It will be seen that when the door is closed, the bolts may over-engage the keeper portions, and in fact moved inwardly into such over-engaging relationship by the guide portions 44 as they are drawn forwardly. As the arms 40 move forwardly, the pivot means 50 which connect links 42 to arms 40 swing substantially to or slightly over center, to exert and maintain great holding force on the door in a closing direction. A retainer 52 is preferably provided to releasably hold the handle and thereby the bolts in the locked position.

The door 30 is provided with a rectangular opening 55 near the bottom through which the load is rammed. At its lower edge, opening 55 terminates flush with the floor of the receptacle. The width of the opening is somewhat less than the width of the door and exceeds slightly the width of the ram portion 70 of the packer unit (presently to be considered in greater detail). The height of the opening 55 substantially exceeds the height of the ram 70. The upper edge of the opening is defined by header jamb portion 56.

When the receptacle is fully loaded with compressed material and the door closed and locked, the packed load is retained by means of separately installable and removable tubular crossbars 75, which prevent re-expansion of the load, and the enclosure is completed by a flexible closure sheet 77, stretched over the opening and crossbars to retain loose materials. The details of the last mentioned parts may best be considered in connection with the concluding portions of the operation of the ram and will be dealt with in greater particularity in that connection.

As indicated in FIGURES 1–3, the receptacle is adapted to function in cooperation with a compacting unit C, to which it is coupled during loading. The compacting unit may, as shown, be permanently installed upon a floor F adjacent a raised shipping dock D which provides for convenient access to the hopper bin 84 of the compacting unit. The compacting unit includes means for slidably supporting and actuating the previously mentioned ram 70. A lower section 71 of the compacting unit structure located adjacent the shipping dock D and covered by a platform 80 which may conveniently form an extension of the shipping dock incorporates guides and actuating hydraulic cylinders for the ram. A higher load-receiving hopper bin portion 82–84 is located directly behind the opening 55 when the transportable receptacle is in coupled position. The upper portion 84 is flared for guiding material into the lower ram chamber portion 82. The side frame structure of the compacting unit includes a rigid longitudinal beam 85 extending its full length on each side.

Figure 7:
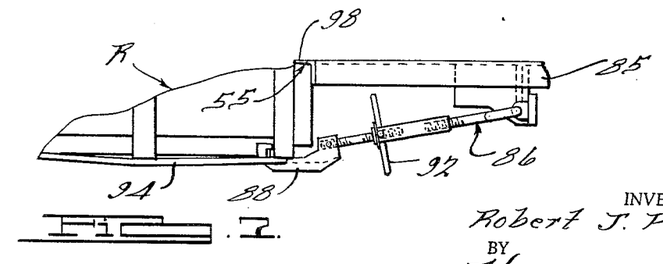
FIGURE 7 is a fragmentary sectional plan view taken substantially on the line VII—VII of FIGURE 3, and looking in the direction of the arrows.
Figure 8:
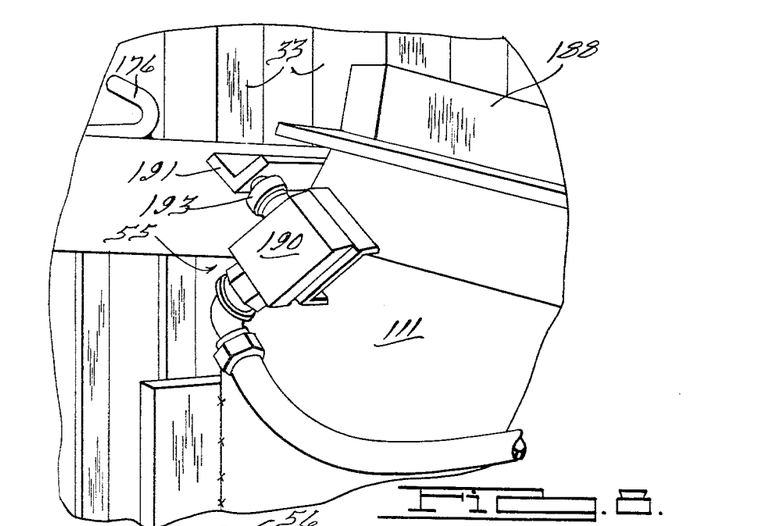
FIGURE 8 is a detail perspective elevational view on a larger scale of the portion enclosed in the circle designated VIII in FIGURE 3.
Figure 10:
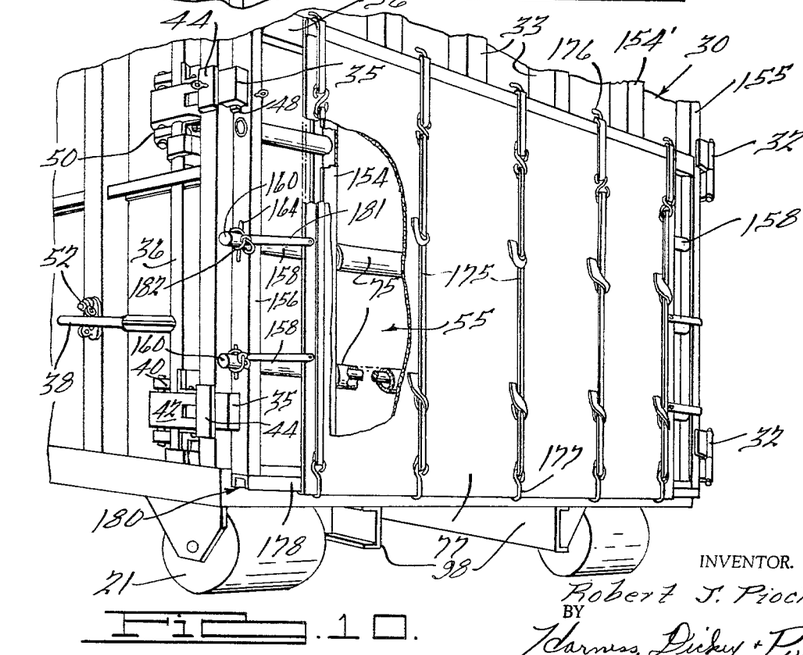
FIGURE 10 is a fragmentary perspective view of a rear portion of the transportable container with the parts arranged as when loaded and ready for transportation.

Rigid detachable grappling means are provided for connecting the receptacle R to the compacting unit C on both sides, and each may comprise a heavy turnbuckle structure generally designated 86 rigidly secured at its rear end to the beam 85 and having a hook portion 88 at its forward end releasably over-engageable, with a stiff vertical beam 90 located at the side of the receptacle adjacent to the rear corner thereof. The turnbuckles may be longitudinally extendable and retractable in overall length by conventional reverse threaded screw jack means as shown in FIGURE 7, operable by hand grip nut means 92. In the area of beams 90 over-engaged by hooks 88, the beams 90 may be reinforced by angle braces 94 secured to and forming a part of the side frame structure of the receptacle R. The reaction of the ramming force is taken by the turnbuckle assemblies, which prevent separation of the receptacle from the compactor assembly during loading.

In order to assist in the movement of the receptacle into proper alignment with the compacting unit as the receptacle is rolled rearwardly into position (in a direction opposite to arrow 22), rigid guide means 96 are anchored to the floor and engageable with bottom beams 98 to position the receptacle laterally. It will be appreciated that the receptacle is moved into position and coupled to the compacting unit in the manner shown with the rear door 30 closed and secured by the bolts 35, and that loading takes place through the opening 55.

The ram, generally designated 70, is in the form of a right hexahedron and is supported in the compacting unit for slidable movement in a direction which, while generally fore and aft with respect to the receptacle, inclines slightly upwardly as the ram moves forward. Preferably, the front compacting face 71 of the ram is approximately perpendicular to the direction of ram travel, and as the ram moves inwardly through the opening 55 to the fully projected position indicated in FIGURE 3, material which is being forced into the receptacle is thereby also urged slightly upwardly, so that during the last stages of packing the load is also urged away from the floor.

The compacting unit frame structure includes flange portions 98 at the front side edges. These project part way into the opening 55 of the receptacle when the latter is coupled to the compacting unit. Flanges 98 are cut away at three vertically spaced areas, designated 100, to permit passage of the securing means for the crossbars 75 therethrough from the side after loading is completed.

In addition to the smooth closed front portion 71 previously mentioned, the ram is closed at its top by a solid steel sheet 102. The sides of the ram are also provided with smooth sheet closures 104 which extend rearwardly far enough to cover that portion of the ram which projects into the receptacle when the ram is fully projected to the in position. The rear edges of the side plates 104 are designated 105 in FIGURE 5. The ram, which is fabricated with a structural steel frame 110 assembled by welding or other appropriate rigid fastening means, may be left open at those portions of its sides and bottom to the rear of the line defined by the edges 105.

Figure 5:
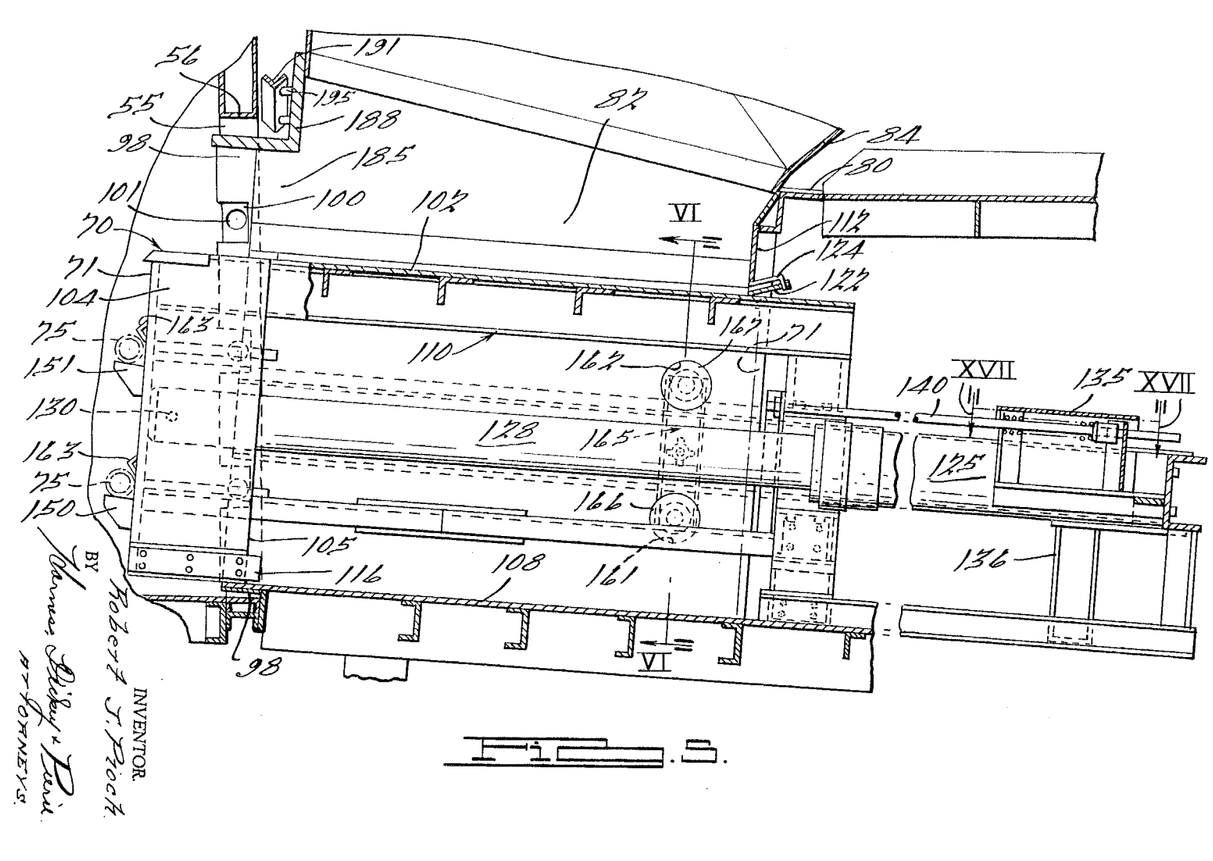
FIGURE 5 is a longitudinal sectional elevational view of the compacting unit taken substantially on the line V—V of FIGURE 4, and looking in the direction of the arrows.
Figure 6:
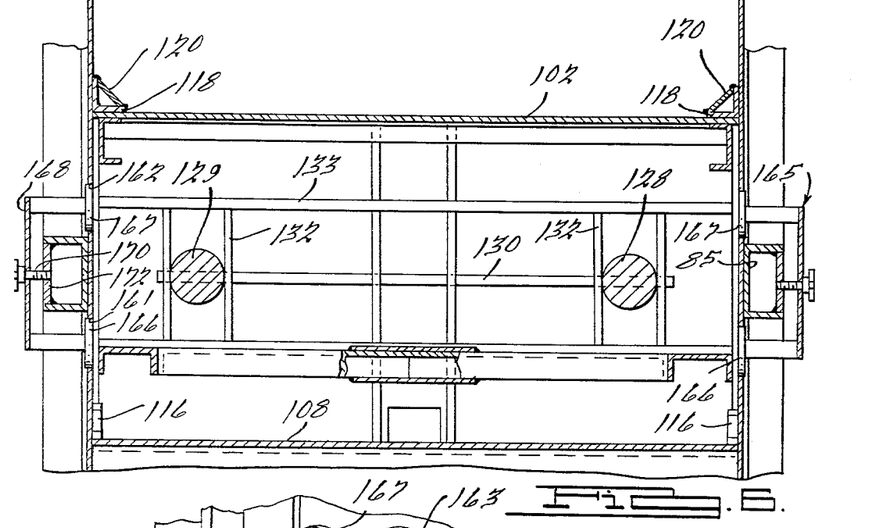
FIGURE 6 is a cross section taken substantially on the line VI—VI of FIGURE 5 and looking in the direction of the arrows.

When the ram is fully retracted, to the position indicated in dotted lines in FIGURE 5, the front wall 111 of the ram coacts with the closed side walls 111 of the compacting chamber 82. The compacting chamber portion is provided with a smooth sheet steel floor 108, and a rear wall portion 112 which, with similar upwardly extending side wall portions joined to the flared hopper mouth portion 84 coact with the compacting chamber to define a box-like receptacle for the receipt of waste material.

The ram slides upon suitable ways from the retracted position indicated in dotted lines in FIGURE 5, in which it opens the compacting chamber and lies substantially entirely beneath the platform 80, to the projected position shown in the same view, in which it projects slightly into the container R. The rearwardly extending portions of the side frame channels 85 form slide bearing supports for the rear end of the ram. Slide bearing blocks 114 rigidly attached to and extending outwardly from the sides of the rear frame structure of the ram overlie the tops of and are slidable upon the channels 85, while similar blocks 115 underlie the bottoms of channels 85 to prevent upward displacement of the rear portion of the ram. At the front, the ram rests and slides upon the floor plate 108. Lateral displacement of the front of the ram is prevented by lateral bearing blocks 116 engageable with the side wall portions 111. Upward displacement of the forward portion of the ram is prevented by angle irons 118 having horizontal bottom flanges overlying the top of the ram at the sides. Angle irons 118 are secured to the interiors of the side walls 111 of the hopper box portion. Inclined tops are welded in overlying position with respect to angle iron flange portions 118 to prevent waste material from catching and hanging up on such flanges.

As best shown in FIGURE 5, the lower edge of rear wall portion 112 of the hopper box enclosure is preferably spaced a slight distance above the top of the ram and carries along its bottom edge an inclined scraper plate 122. Scraper plate 122 inclines downwardly and forwardly as shown in FIGURE 5, and its front edge rests on top of the ram, the upper rearward edge of scraper plate 122 being hingedly supported by bracket means 124 attached to plate 112, such attachment permitting limited swinging movement of plate 122 about a transverse axis, so that the plate may accommodate itself to any deformation or non-linear movement or any adherent material while remaining in substantial sliding contact with the top plate 102 of the ram so that it may tend to scrape unwanted material from the ram.

The ram is actuatable by a pair of fluid motors shown as comprising two hydraulic cylinders, 125, 126, mounted in the rear section of the compactor unit below the platform 80 and having piston rods 128, 129 coupled to the ram near the front by a cross rod 130. Cross rod 130 is projected through drilled forward extremities of the piston rods and through the vertical plates 132 secured by welding to the rear surface of front ram plate 71. Plates 132 and similarly attached horizontal plates 133 also function to stiffen the front of the ram.

Figure 17:
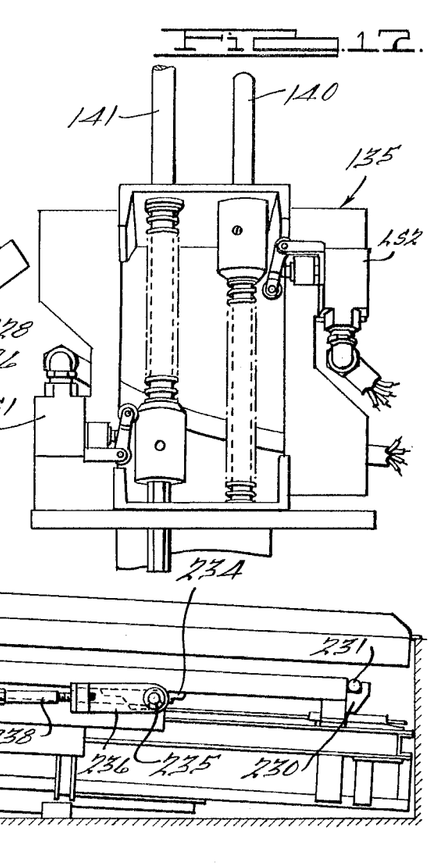
FIGURE 17 is a fragmentary detail plan view taken substantially on the line XVII—XVII of FIGURE 5, and looking in the direction of the arrows.

Since the piston rods extend forwardly from the pistons through the forward portions of the cylinders 125, 126, a lesser quantity of fluid per inch of ram travel is required during retraction than during advancing movement, so that retraction of the ram is effected at greater speed and with less power than advancing movement. Preferably, in order to speed the reaction, the piston rods are made relatively large in proportion to the cylinders, as shown in FIGURE 5. The control of the delivery of hydraulic fluid to the opposite ends of the cylinders to advance and retract the ram includes a reversing switch housing 135 mounted beneath the platform 80 on the frame structure 136 of the lower rear portion of the compacting unit. Internal components of housing 135 are shown in FIGURE 17 and will be considered in connection with the control system hereinafter.

Secured to the front plate 71 of the ram are two pairs of horizontally spaced forwardly projecting brackets, the lower pair designated 150 and the upper pair 151. One bracket of each pair is located near each side of the ram. The lower pair 150 is so located that if one of the previously mentioned load retaining crossbars 75 is placed on such pair of brackets, and the ram is moved forwardly until the bar 75 is in alignment with the door edge members 155, 156, the bar 75 will also be aligned with a set of axially aligned holes 101 extending transversely through the members 155, 156 and also through the vertical ribs 154, 154' which constitute the side jambs of the opening 55 in the door 30. The bar is of course of such length as substantially to bridge the opening 55. Similarly, the upper pair of brackets 151 is in such position that another crossbar 75 placed on these brackets is alignable with an upper set of aligned openings 101 in ribs 154, 154', 155, 156 by proper positioning of the ram. The axially aligned apertures in ribs 154'-155 are preferably connected by hollow guide pipes 158, thereby providing in effect a continuous long opening in each instance, extending inwardly from the hinged edge of the door to opening 55 and similar guide pipes 158 connect the aligned holes in rib 156 at the free edge of the door with those in rib 154. Thus when the rods 75, which are actually tubular, are aligned with such openings 101, retaining pins 160 may be thrust inwardly through openings 101 and into the interiors of the tubular crossbars 75. The pins 160 thereby form in effect continuations of the crossbars and hold the latter firmly in position across the opening 55 to retain the load after compaction.

In order to enable convenient placement of the tubular crossbars 75 on the brackets 151, a pair of vertically spaced ports 161, 162 are provided in one or both of the side walls 111 of the hopper box. These ports are so located that when the ram is in a substantially retracted position the tubes 75, which are formed of sections of heavy-walled pipe, may be inserted through such ports to positions extending across and resting upon the brackets 150 and 151. The brackets 150, 151 are inclined upwardly so that the pipes 75 are retained by gravity. Accidental upward displacement of the pipes 75 during forward movement of the ram is prevented by projections 163 on the ram face located spacedly above each bracket as shown in FIGURE 5. In order to prevent waste material from escaping through or catching in holes 161, 162, a dual cover assembly generally designated 165 is provided, having closure pads 166, 167 spaced in conformity to the spacing of the holes 161, 162 and suitably rigidly carried by a bar 168 and adapted to be fastened in a covering position by means of a hand screw 170, the screw portion of which is threadably engageable with a suitably tapped hole 171 in a plate 172 fastened to the side of the hopper box.

The control system permits movement of the ram to a position which aligns the brackets with the holes 161, 162 to permit insertion of the pipes through such holes so that they may rest upon the brackets. This is of course done after the transportable container R has been packed to capacity. The ram is then moved forwardly until the pipes 75 are aligned with the holes 101. Such movement of the ram normally is opposed during the final travel of the ram by the load, which tends to bulge through the opening 55, and the ram may advantageously be forced all the way in, as shown in FIG. 5, and then backed out to the aligned position. The pins 160 are then inserted through the pin receiving holes 101 and pipes 158 to retain the pipes 75 in position and prevent the compressed load from bulging outwardly through the door opening 55.

I preferably also provide the flexible sheet of canvas or the like 77, previously mentioned, which covers and substantially overlaps the opening 55 to retain any loose material which might otherwise shake from the load during transportation. Sheet 77 is retained by flexible rubber or other stretchable bands 175. At their upper ends the bands 175 are over-engaged with hooks 176 positioned above the door opening 55, while at their lower ends the bands carry hooks 177 which, when the bands are stretched downwardly, underengage and so retain their position on the downturned rear flange 178 of channel member 180 which defines the bottom frame member of the door and also constitutes the sill of opening 55. Each retaining pin 160 is provided with a cross pin 164 which limits the insertion of the retaining pin. In order to prevent accidental dislodgment of the retaining pin, a stretchable band as 181 is provided for each of the pins 160. One such band is attached to the side edge of the sheet at a position opposite each of the pins 160, and carries at its free end a ring 182 which is large enough to fit over the outer end of its pin 160, but too small to pass over the cross pin 164. When the ring is hooked over the enter end of the pin, the band 181 is stretched and its contractive force draws the ring 182 inwardly against the cross pin 164 to yieldably retain the pin 160 in position. Bands 181 also assist in holding the sheet 77 in position.

It will be noted that a substantial clearance 185 is left between the top of the ram 70 and the header 56 of the opening 55. Such clearance is in the neighborhood of 10 inches in its vertical dimension in a typical installation of the character shown. By virtue of such clearance, if a long heavy object, which might not be breakable or shearable by any pressure which it would be practical to develop, should be dropped into the hopper and fall to a position across the upper front corner of the ram, the ram will not ordinarily be required to shear or break the obstruction, in order to move all the way to the in position. Instead, the ram will ordinarily simply carry the object forwardly and either dislodge it or cause its rear portion to be tipped downwardly and lie horizontally on top of the ram. Upon the subsequent retraction of the ram to permit the insertion of new material, the object, unless extremely long, will drop down to the floor 108 of the compaction chamber and then be driven forwardly into the receptacle R in the normal manner upon the next forward movement of the ram.

If an obstructing object is too big to be dislodged in the manner described, and too strong to be broken by the ram, a further protective feature comes into play and retracts the ram before any damage can occur. It will be noted that the transverse angle member 188 (FIG. 5) which forms part of the frame of the compacting unit is of heavy section (preferably steel) and protects the upper front corner of the compaction chamber and the header 56 of door opening 55. The heavy cross member 188 is secured at its ends to the side walls of the hopper box assembly and is stiff enough so that no substantial distortion can occur except in the case of very severe overload. In event of such a heavy overload that the member 188 commences to bow, the ram is immediately and automatically reversed to relieve the load and cannot be projected under full power in such manner as might strain the apparatus, or the coupling portions and turnbuckle means 86, etc. Such safety reversing means includes a microswitch 190 which is so mounted and so connected to the control system that when the parts are distorted to a predetermined degree, but still within their elastic limit, switch 190 is actuated and the drive is thereby reversed to retract the ram. Switch 190 is operated by a bar 191 carried by the hopper box structure and which extends transversely of the same above the bottom flange of the angle member 188 and in front of but close to the vertical flange of member 188. When the compacting unit and container R are coupled there is sufficient space between the vertical flange of member 188 and the header 56 so that the bar 191 is free of engagement with either except at two points of attachment. Bar 191 is supported at its end farthest from the switch 190 by an attaching weldment which secures its remote end to the angle member 188, and extends freely through the air to its free end except in a central area of the bar 191, in which central area the bar 191 is also secured to the angle 188 by a rigid bridging weld 195. The free end of bar 191 rests against button 193 of switch 190 and normally holds the switch contacts (LS3, FIG. 15) closed. It will thus be seen that if the angle brace 188 should be bowed forwardly and/or upwardly, the flange of angle member 191 which rests against button 193 will tend to move away from such button, permitting the switch to open, thereby energizing the reversing circuit and causing the ram to retract, as will be explained more fullly hereinafter in connection with the control system.

A further safety feature resides in the provision of the chain 200, incorporating a resilient spring element 202 within its tensile length. One end of the chain is releasably secured to the frame structure of the receptacle adjacent the jamb at the free edge of the door and the opposite end of the chain is connected to the door. When the load is to be discharged at the dump or the like and the door is unlatched, some of the energy stored in the compression of the load is released and tends to drive the door open with great force, so that injury might be inflicted upon anyone standing in the way. The chain 200 limits such opening of the door and prevents it from flying all the way open under the force of the first re-expansive effort of the load. Such effort is spent by the time the door has opened to the extent of 3 or 4 feet, however, in which position it is arrested by the chain. The chain may thereafter be removed, the door fully opened, and the load can be readily dumped from the tapered receptacle R by tilting the truck bed. Due to the tapered contour and the smooth internal walls of the receptacle, the load will slide out freely despite its compaction.

If desired, means may also be provided for dumping or tipping a loaded hand cart or the like into the hopper. In the preferred dumping arrangement shown in FIGURES 11–14, only the compactor portion of the refuse handling system and its associated dump mechanism are illustrated. The compactor may in all essentials be similar to the compacting unit previously described, although the upper hopper bin portion 84' is of somewhat different shape from that of the portion 84 of the compactor previously illustrated. This will be recognized as a design detail which is varied simply in accordance with the nature of the refuse or the carts or other apparatus used to deliver refuse to the hopper box. In the illustrative form shown in FIGURES 11–14, it is presumed that wheeled carts of substantially rectangular open-topped form are to be used for carrying refuse to the hopper, one such cart being shown, designated 210. When such a loaded cart is wheeled out onto the platform 80 to a position close to the hopper bin 84', a forwardly extending fork 211 secured to the bottom of the cart becomes inter-engaged with a portion of a lifting saddle 212. The saddle 212 is in the form of a rectangular sling having vertical side walls spaced apart sufficiently to permit the cart to be rolled between them and over the top of the transverse bottom wall 215 of the saddle. The bottom wall 215 normally rests flat on the platform 80 when the saddle is in the lowered position, shown in FIGURE 11.

Figures 11, 12A:
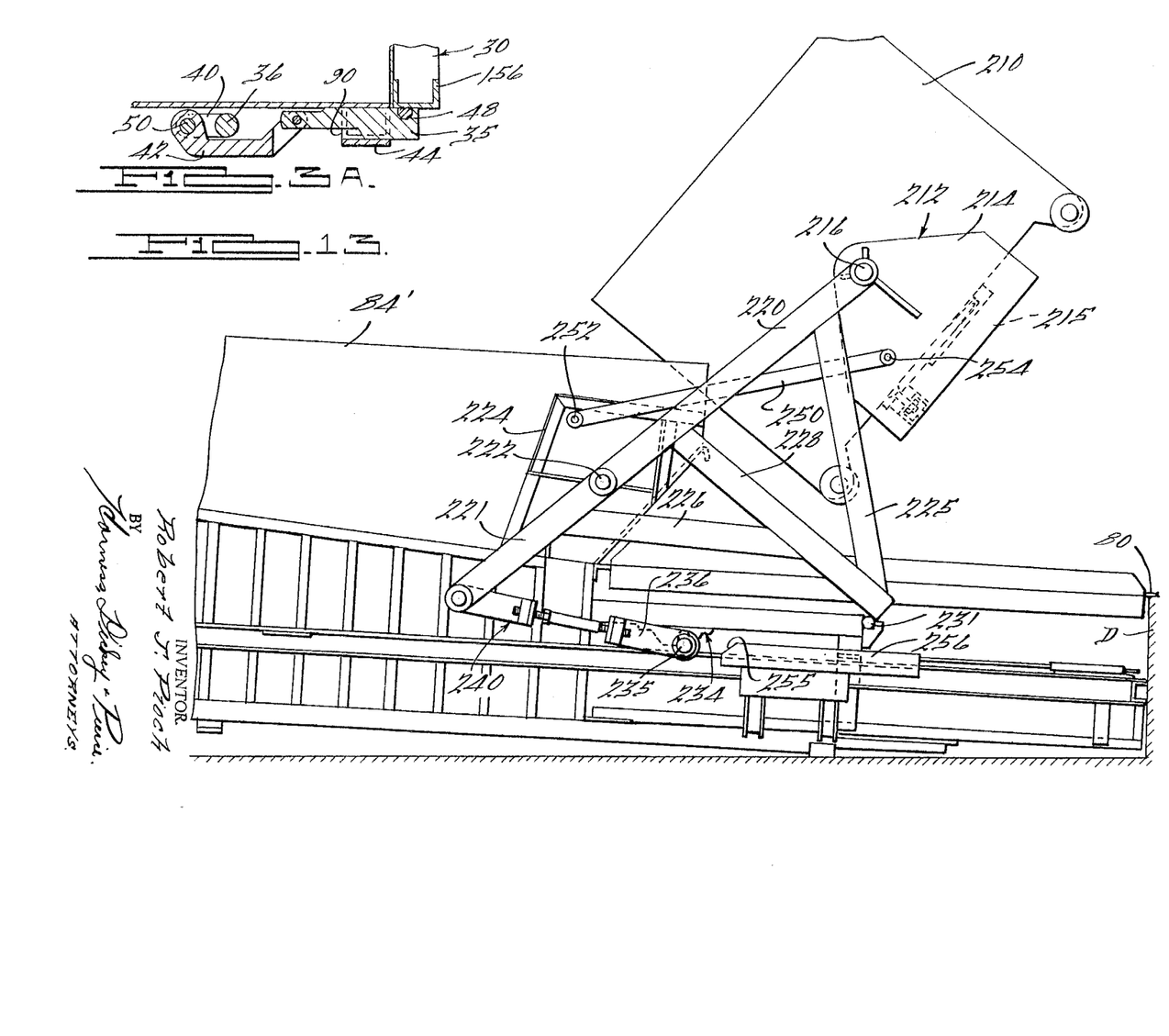
FIGURE 11 is a side elevational view showing an improved lifting-dumping mechanism for refuse gathering carts, the compacting unit being fragmentarily illustrated in side elevation and slightly modified in construction.
Figures 11, 12:
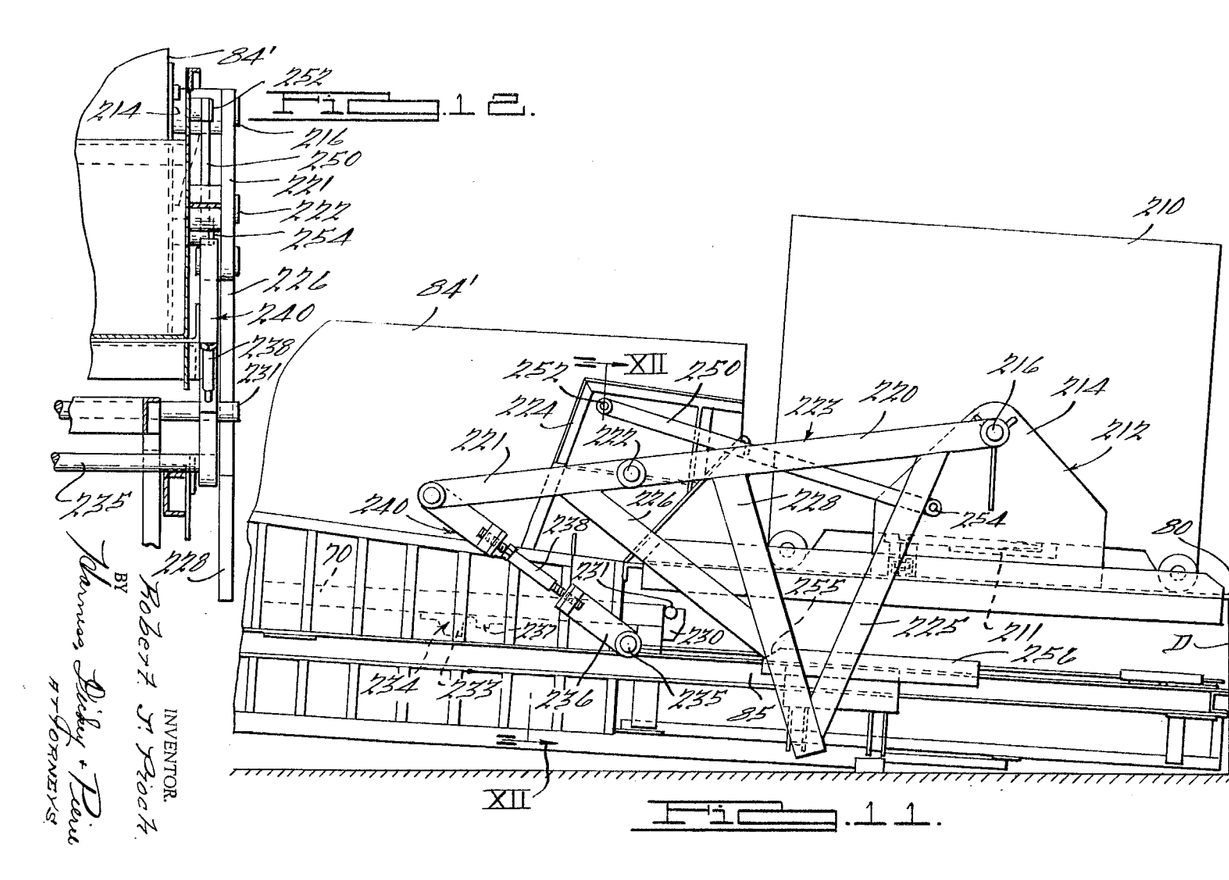
FIGURE 12 is a vertical sectional view taken substantially on the line XII—XII of FIGURE 11, and looking in the direction of the arrows.

The dumping mechanism is arranged to lift and tilt the refuse collection carts such as the cart 210 to an inverted position over the hopper top 84' to dump the contents, and then return the carts to the position shown in FIGURE 11 to be rolled back and returned for refilling.

The saddle 212 is supported in trunnion bearings 216 which are carried by arms 220 of trussed levers 223 swingable about transverse stationary pivots 222 supported by frame structure 224. One such supporting frame structure 224 and pivoted trussed lever 223 is located at each side of the compacting unit, arranged in vertical planes in such manner as to leave free access to the bin over the platform 80 and over the bottom 215 of saddle 212 when the latter is down. The trussed lever system includes diagonal members 225, 226 rigidly secured at one end to the lever arms 220, 221 respectively at positions spaced from the fulcrum 222. Arms 225, 226 converge as they extend downwardly and are rigidly joined to a member 228 which is also joined to the lever and extends more nearly perpendicularly therefrom. Member 228 also inclines in a direction toward the saddle member, but at a lesser angle than member 226.

In FIGURE 11 the ram is shown projected to the full in position. At this time the lift mechanism is lowered so that the saddle and cart rest on the platform 80. Secured to the rear of the ram I provide means for exerting a camming force upon the members 226 and 228 to rock the trussed levers in a direction to lift the saddle and cart as the ram moves rearwardly. As shown in FIGURE 11, I provide on the rear of the ram, a pair of rigid bracket-like receptacles 230 in which a bar 231 may be placed in such manner that its ends project out through the open sides of the rear portion of the compacting assembly. As the ram moves rearwardly (to the right, in FIGURES 11, 13 and 14) the projecting ends of the bar 231 engage the sloping forward surface of truss member 226 and exert a camming force which rocks the trussed lever assembly in a direction to lift the cart (counterclockwise as viewed in FIGURE 11). As the ram continues rearwardly, the bar travels outwardly along members 226 and 228 toward the outer (lower end) end of member 228, and as the bar 231 reaches the end of member 228 (see FIGURE 13) additional abutment means 234 on the ram engage and pick up a bar 235 coupled to arm 221. Abutment means 234 comprises a pair of laterally spaced abutment brackets having oppositely facing depending abutment portions 233 and 237 spaced apart a distance slightly exceeding the diameter of bar 235. Bar 235 is held at its ends in clevis portions 236 of link assemblies generally designated 240, one such link assembly being pivotally connected to the outer end of the arm 221 of each lever 223. As shown in the drawing, the lengths of the links may be adjusted, a portion of each link being formed as a turnbuckle 238 for this purpose. The cross bar 235 may conveniently ride on the tops of the side rails 85. As the ram continues rearwardly from the position of FIGURE 13 toward the position of FIGURE 14, the abutment portions 233 of brackets 234 engage and push the bar 235 rearwardly, and acting through the link assemblies 240 rock the trussed lever assemblies further to lift the cart to the desired location over the hopper bin 84'. Tilting of the saddle and cart is effected by a link 250 pivotally attached at one end to the frame structure 234, at the position designated 252, and at its other end pivotally connected, at 254, to the saddle assembly side plate 214.

Figure 14:
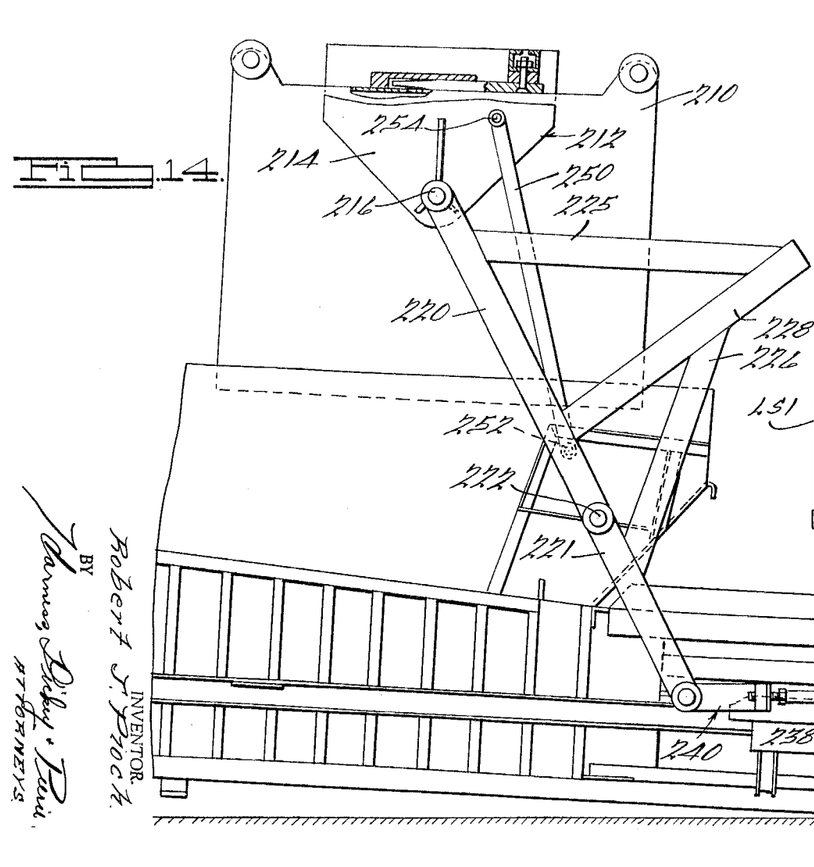

When the center of gravity of the mass represented by the cart and the portion of the trussed lever structure and associated parts moves over the center of fulcrum 222 in traveling to the overlying position with respect to the bin, it will be seen that gravity tends to assist the final movement from such over-center position to the completely inverted overlying position of the cart, shown in FIGURE 14. In order to prevent free fall during such final portion of the movement, with resulting undesirable impact stressing of the parts, the bar 235 is, during such final portion of its travel, moved up into a trapped position between abutment portions 233 and 237 of brackets 234. It will be seen that the abutment portions 233 project downwardly farther than abutment portions 237 which act as restraining or holding abutments during the aforementioned final increment of travel. Abutment portions 237, being shorter, do not interfere with the function of the abutment portions 233 in picking up the bar 235, as shown in FIGURE 13, during lifting, because the vertical spacing between the bottom of abutment portions 237 and the tops of beams 85 slightly exceeds the diameter of the bar 235. After the abutment members 234 have picked up the bar 235, however, and preferably somewhat prior to the attainment of the aforementioned overcenter position, the bar 235 rides up upon inclined camming nose portions 255 leading to slightly elevated track portions 256, upon which bar 235 rides during the final portion of its rearward travel. The bar is thereby cammed upwardly into and held in the slot-like opening between the abutment portions 233, 237 and independent movement of the cart and supporting trussed lever and linkage mechanism under the influence of gravity is therebf prevented. This arrangement also permits abutments 237 to return the cart and mechanism from the full dumping position of FIGURE 14 to and beyond the overcenter position upon return travel which occurs during the next projection of the ram.

It will be seen that the improved dumping mechanism automatically lifts and tips the saddle 212 and a contained cart during the retracting travel of the ram, and returns the cart to the platform 80 during advancing movement of the ram. The control system is ordinarily arranged so that the operating cycle of the compacting unit ends with the ram in the forward or in position, and the saddle resting on the platform as in FIGURE 11. Thus, in the normal rest position, the apparatus is properly disposed for convenient removal and replacement of carts with respect to the saddle. It will also be observed that when it is not desired to use the lifting and dumping apparatus, it is merely necessary to withdraw the rods 231 and 235. When such rods are removed, the lift-dump apparatus is disabled and the lever and linkage system remains in the position indicated in FIGURE 11, while the compacting apparatus remains operable in the normal manner. It will also be appreciated that the lifting and dumping apparatus may be dispensed with or altered without affecting the operation of the other portions of the apparatus.

Figure 15:
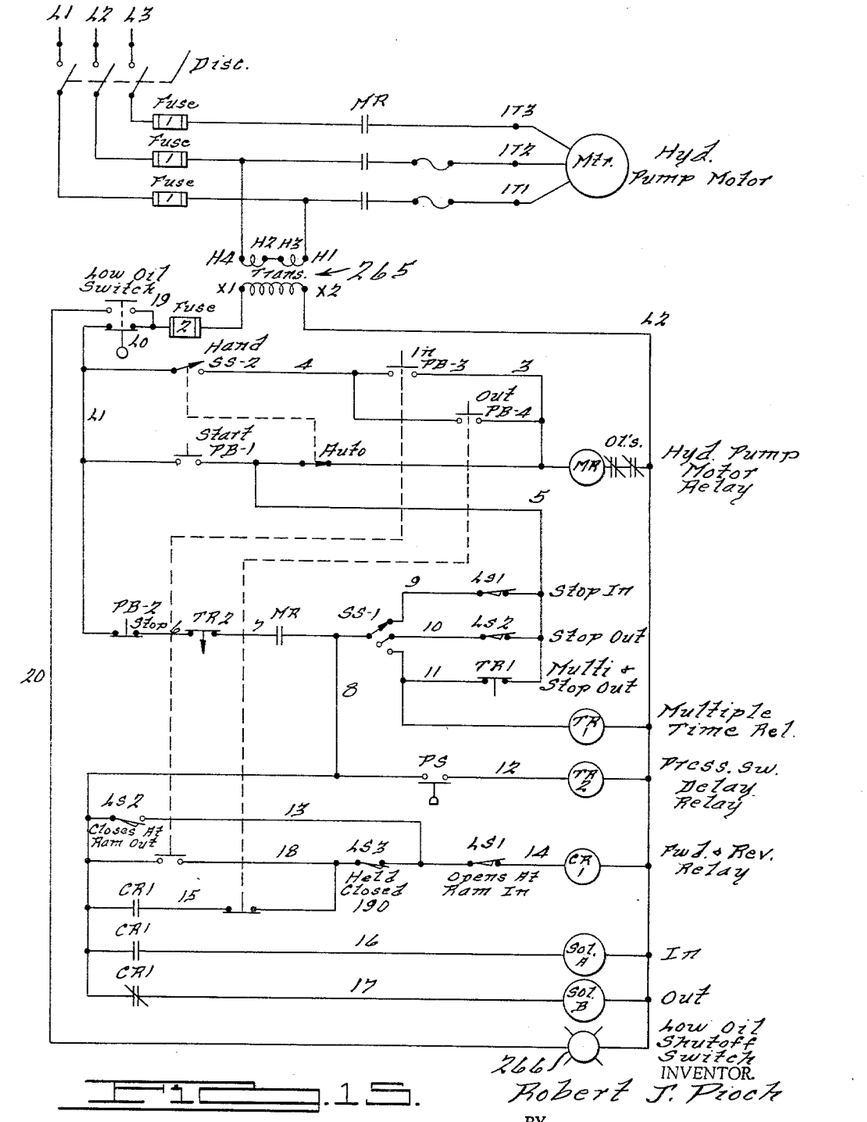
FIGURE 15 is an electrical diagram showing the principal control components.

The actuating and control system for the compactor is also subject to wide variation. A preferred arrangement which I have employed with success, however, will be disclosed with particular reference to FIGURES 15–17. FIGURE 15 shows the electrical arrangement of the principal components, and diagrammatically indicates mechanical interrelationships as well. FIGURE 16 illustrates a preferred control panel arrangement. The main electrical cabinet 260 having the control panel 261 as its front wall may of course be mounted at any location convenient to the operator as for example on the side of a sub-assembly incorporated in a cabinet 267 (FIG. 2) which houses the pumps, pump motor and related hydraulic components. As shown in FIGURE 16, the main control panel includes on its face actuating knobs 262, 263, 264, 265. Knob 262 for switch SS2 is selectively shiftable to either a manual position, or an automatic ("auto") position. Knob 263 for switch SS1 is selectively shiftable to any of three positions, viz: "stop in," "stop out," or "multi and stop out." In the first of such positions the ram will perform one cycle and stop in the in position. In the second, the ram after completing its cycle will stop in the out position, and in the third of such positions, the ram will perform several cycles, to a number determined by the time delay switch TR1, and then stop in the out position. These positions and the connections to effect this operation will be seen to be correspondingly indicated in the diagrammatic FIGURE 15. Actuators 264 and 265 are push buttons, designated "in" and "out" respectively for the switches PB3 and PB4. Switches PB3 and PB4 include contacts for the forward and reverse relay coil TR2 and for the motor relay coil MR. Push button switches PB3 function only when the control knob 262 for switch SS2 is in the hand or manual position. Under such conditions, the "hand" contacts of SS2 in conductor line 4 of FIGURE 15 are closed, and the "auto" contacts of SS2 are open, and if the button 264 of PB3 is held in, the motor relay circuit is closed, starting the motor to drive the pumps and supply hydraulic fluid for the cylinders, and closing the MR contacts in line 7. Relay coil CR1 in line 14 will thereby be energized if conditions are normal and the ram is not already all the way in, closing the contacts CR1 in the line 16 to the in solenoid, and also closing the holding contacts CR1 in line 15. At the same time, the normally closed contacts CR1 in line 17 are opened to keep the out solenoid in line 17 deenergized. Thus, the relay and the motor contacts are energized until, when the ram reaches the full in position, it opens limit switch contacts LS1 in line 14 thereby permitting the in solenoid contacts CR1 in lines 15 and 16 to open the out solenoid contacts CR1 in line 17 to close. If the in button 264 is held down after the ram is all the way in, the ram will commence to move outwardly, because of the energization of solenoid B in line 17 inasmuch as the contacts MR in line 7 will be closed, but as soon as the ram moves slightly away from the in position, switch LS1 will be actuated, closing the LS1 contacts in line 14. Thus, if the in button is held, the ram will simply oscillate in a very short stroke near the fully in position. This is in a range which prevents the ram, or piston, from bottoming or striking at the extreme end of travel, and calls the operator's attention to the attainment of the in position by the ram.

If, with SS2 in the hand or manual position, the out button 265 is held down, and conditions are normal and the ram is not already all the way out, the upper contacts of switch PB4 close the motor relay circuit and the MR contacts in line 7 are thereby closed and the solenoid B is again energized through closed contacts CR1 in line 17. The in solenoid in line 16 remains deenergized, inasmuch as lines 13, 15 and 18 are all open. The MR holding contacts in line 7 are closed and current is supplied through lines 6, 7, 8 and 17 to maintain energization of solenoid B causing the ram to back out. When the ram reaches the full out position, the LS2 contacts in line 13 are closed, and the forward-reverse relay coil CR1 is thereby energized since a circuit is completed through line 14, the contacts LS1 in that line being closed inasmuch as the ram is no longer in the full in position required to close such contacts. If the out button is held down at such time, it will be seen that solenoid A in line 16 will be energized and solenoid B deenergized because the energization of the forward-reverse relay coil closes the contacts in line 16 and opens the contacts in line 17, as indicated previously. As soon as the ram starts back in, however, under such conditions, the LS2 contacts in line 13 are opened by the initial forward movement of the ram, deenergizing the forward-reverse relay coil so that the ram again oscillates through a very short cycle near the full out position and without permitting the ram or the piston to strike.

When knob 262 of switch SS2 is turned to the automatic ("auto") position, the in and out buttons of switches PB3 and PB4 are disabled by the opening of the "hand" contacts of switch SS2 in line 4 and the motor relay MR can only be energized by pushing the "start" button of switch PB1. The start button of PB1 and the "stop" button of PB2 are not shown on the panel 261. These buttons are preferably located in a separate small control box 300 (FIG. 2) which is wired into the circuit through a flexible cord 301 so that such buttons may be located at a convenient location, for example, either adjacent the platform or near the side of the bin of the packer unit. It will be seen that when the hydraulic pump motor relay is deenergized, the MR holding contacts in line 7 are open, so that if PB1 is also open, no current is supplied to the hydraulic pump motor relay MR. When button PB1 is pushed, energizing the hydraulic pump motor relay to pull in the MR contacts, the MR contacts in line 7 complete a holding circuit through one of the contacts of switch SS1 via line 9, 10 or 11. If SS1 is closed to line 9 it will be seen that the ram will operate until switch LS1 is actuated at the completion of the inward movement of the ram, which opens the holding circuit at the LS1 contacts in line 9 and stops the ram in the in position. If switch SS1 is closed to line 10, the holding circuit will remain closed and continue to energize the ram until it reaches the out position, thereby opening the LS2 contacts in line 10 and again stopping the hydraulic pump motor and arresting movement of the ram. If SS1 is closed to line 11, it also maintains a circuit through line 10, as shown, and the timer relay contacts TR1 in line 11 remain closed for a time period depending on the setting of the timer relay, the coil of which is in the line marked "multiple time," and which is simultaneously energized through line 7 when switch SS1 is in such position. The multiple time relay may be a commercially available or any suitable time delay relay, adjusted to a setting suitable to the type of load and the size of the bin, so that, for example, if the bin is filled with the normal or average type of waste material to be compacted, the ram will take a sufficient number of strokes to inject all of the material into the container before stopping.

With the arrangements shown, after such multiple cycling, the ram will stop in the out position. As noted, when the contact of switch SS1 is in the "multi" position, it connects both lines 10 and 11 to line 7. Thus, although limit switch contacts LS2 of line 10 are opened each time the ram reaches the fully retracted position, the machines continues to operate and the motor contacts remain closed as long as contacts TR1 of line 11 are held closed by the multiple time delay relay. After the contacts TR1 of line 11 are opened at the expiration of the set time, however, the contacts LS2 of line 10 only maintain the holding circuit until the ram reaches its next fully retracted position. During any such remaining travel required to reach the retracted position, the current to line 17 via line 8 and 7 is also maintained through the closed MR contacts in line 7 until when the retracted position is reached, the opening of the contacts LS2 of line 10 interrupts the current to the motor relay and stops the ram in the retracted position, thereby also opening the MR holding contacts in line 7.

It will also be seen that if at any time during the operation the button switch PB2 is actuated, line 7 is opened, thereby stopping the ram instantly.

I preferably also provide a time delay relay TR2 arranged to automatically shut off the system and stop the ram if the compactor unit does not complete a compacting cycle within a predetermined time. If load has reached maximum compaction or the ram should in any manner become jammed or arrested so that it can not complete its operation within a set time interval, the pressure switch contacts designated PS in line 12 are closed by the attainment of a predetermined maximum pressure corresponding to the maximum ram effort normally desired as a limit. As soon as the pressure in the hydraulic system reaches such predetermined value, the closing of the contacts PS starts the time delay relay TR2 which maintains the contacts TR2 in line 6 closed for the time interval for which the delay relay is set. If a cycle of the machine is completed within such interval, the machine stops normally as indicated previously, MR contacts in line 7 are opened, and time delay relay coil TR2 is deenergized, so that upon restarting for the next cycle, it initiates a new time interval. If, for one of the reasons indicated, however, the cycle is not completed within the time interval set by TR2, the TR2 contacts break the holding circuit through lines 6 and 7, stopping the hydraulic pump motor and opening the MR holding contacts in line 7. Such automatic cut off pressure is set at a value which is less than the maximum pressure which the machine is capable of exerting. For example, in my commercial embodiments, I have arranged such cutoff at 1500 p.s.i., whereas the stystem and machine will easily safely withstand 1800 p.s.i. This constitutes a convenient method of sensing the attainment of a properly packed load, since when the container R is fully packed by the normal operation of the machine which reaches the pusher value corresponding to 1500 p.s.i. in the hydraulic system, the ram will ordinarily be arrested in its inward movement in an intermediate position. The operator may then manually change the pressure release setting temporarily to 1800 p.s.i. and restart the system, the timer relay TR2 having reset itself when deenergized. The over-pressure of 1800 p.s.i. is sufficient to complete the final packing stroke and fully load container R. Thereafter, the ram may be backed out and the container secured and closed in the manner previously described, and replaced.

As also shown in FIGURE 15, I preferably provide a switch actuator 266 connected to means (not shown) for sensing low oil supply level in the hydraulic system, thereby opening the contacts Lo in the main control line L1 leading to one side of the control system supply transformer 265 if the oil supply should fall below a safe level, immediately deenergizing the motor relay and stopping the system, and at the same time closing a pair of companion holding contacts in lines 19 and 20 to maintain a holding circuit to the relay 266 and prevent reactuation of the system until the oil is brought up to level.

A further safety feature comprises the safety switch 190, the function and mechanical arrangement of which have been described hereinabove. As shown in FIGURE 15, this limit swich has its contacts LS3 arranged to provide the only connection between the forward-reverse relay line 14 and both of the lines 15 and 18. If inward movement of the ram is causing undue distortion of the beam 188, indicating an overload, contacts LS3 are opened. Such a difficulty will only occur when the ram is attempting to move inwardly. At such time, the forward and reverse relay actuator CR1 in line 14 will be in the energized condition via either line 18, if the machine is being operated manually or line 15, if the machine is being operated automatically. In either type of operation, it will be seen that opening of contacts LS3 of switch 190 deenergizes actuator CR1 of line 14 causing the contacts CR1 in lines 15 and 16 to drop open and the CR1 contacts in line 17 to close, causing the ram to retract. When under such conditions, the ram reaches the fully retracted position and thereby closes the contacts LS2 in line 13, the ram will again advance, and if the obstruction has dropped clear so that the ram completes its stroke, the machine will result normal operation. If the obstruction remains in position to stop the ram, switch 190 will again be opened as before. If such a difficulty occurs with the machine on automatic operation, and the obstruction stops the ram often enough to permit TR2 to time out, the machine will shut down in the manner previously described. Under ordinary conditions, however, the operator would note the repeated incomplete cycling, stop the machine by means of the button PB2, and clear the obstruction.

What is claimed is.

1. Material handling and compacting apparatus comprising a container having a ramming port therein and means for detachably securing an injecting and ramming device to said container in alignment with said port, said port being of substantially rectangular cross section, and the injecting and ramming device including a ram having longitudinally extending side and top walls and of substantially rectangular cross section and projecting through said port from a retracted position spaced from the port to a projected position in which said walls lie in said port, the ram substantially conforming in width to the width of the port whereby the side walls of the ram when in the projected position lie closely against the sides of the port, and the ram being of materially lesser height than the port and located and traveling in a path at the bottom of the port to leave a clear space between the top of the ram and the top of the port of a height which is a substantial proportion of the vertical height of the ram, thereby providing clearance for items of substantial bulk overlying the ram.

2. Apparatus as defined in claim 1, said device including a ram chamber portion in open communication with said port when said device is secured to the container, said chamber portion having a relatively rigid cross member spaced a substantial distance above the ram and located near but spaced from the upper edge of the port, and means for sensing unwanted movement of said cross member and arranged to arrest projection of the ram.

3. Material handling and compacting apparatus comprising a container having a ramming port therein and means for detachably securing an injecting and ramming revice to said container, a ram in said device projectable through and beyond and also retractable from said port, and means for retaining material in the container under compaction and simultaneously securing said port against escape of material therethrough, comprising means on the ram for releasably supporting a closure element on the ram for movement therewith, and coacting means releasably carried by the container for fastening such a closure element in position with respect to the container when the closure element is moved by the ram to a predetermined position with respect to the container.

4. Material handling and compacting apparatus comprising an elongated container of substantially rectangular cross section having walls externally reinforced and interiorly relatively smooth and which diverge with a uniform taper toward one end and having a doorway at said end which occupies the full cross section of the container, a reinforced door rigidly releasably securable to said container across said doorway, a ramming port in said door, a separate self-contained injecting and ramming device, a reinforced ramming chamber portion forming a part of said device, and means for detachably securing said device to said container in alignment with said port while said door is closed, said last named means coacting with the reinforcing of both the container and the ramming chamber portion.

5. Material handling and compacting apparatus as defined in claim 3 wherein said container has a door openable to expose substantially the full cross section of the container, a fastening means for said door, said port being formed in said door and of lesser cross section than the container, said said coacting means being arranged to provide holding interengagement between said door and said closure element, independently of said fastening means for the door.

6. Material handling and compacting apparatus as defined in claim 3 wherein said means on the ram comprises a plurality of vertically spaced rests arranged to hold a plurality of tubular closure portions in horizontal positions, vertically spaced from one another and parallel to the plane of the port, said means for fastening said closure portions comprising fastener elements movable into and from interengaged relation with said tubular closure portions.

7. Material handling and compacting apparatus as defined in claim 3 wherein said means on the ram comprises holding portions for holding a closure structure in a position parallel to the plane of the port and transverse to the path of travel of the ram.

8. Apparatus as defined in claim 5 wherein said ram is also projectable through said port a substantial distance beyond said predetermined position and into the interior of said container.

9. Apparatus as defined in claim 5 wherein said ram is also projectable through said port a substantial distance beyond said predetermined position and into the interior of said container, power means for forcing said ram inwardly with respect to said port and container at a predetermined maximum pressure, and means for selectively increasing the pressure exertable by the ram.

10. Material handling and compacting apparatus comprising a container having a ramming port therein, a separate injecting and ramming device, means for detachably securing said device to said container in alignment with said port, a ram forming a part of said device movable in a path extending from a position outside and spaced from said port through the port and into the container, said device having an open-topped combined receptacle and ram chamber through which said ram moves generally horizontally in traversing said path, ram actuating means, tilting means including a lifting element movable by said ram actuating means to lift and tilt collection containers or the like, to dump contents thereof into said chamber, said tilting device including a lever on each side of said device swingable in a substantially vertical plane, and camming means actuatable by the ram and engageable with said levers.

11. Material handling and compacting apparatus comprising a container having a ramming port therein, a separate injecting and ramming device, means for detachably securing said device to said container in alignment with said port, a ram forming a part of said device movable in a path extending from a position outside and spaced from said port through the port and into the container, said device having an open-topped combined receptacle and ram chamber through which said ram moves generally horizontally in traversing said path, ram actuating means, tilting means including a lifting element movable by said ram actuating means to lift and tilt collection containers or the like, to dump contents thereof into said chamber, said tilting device includes a lever on each side of said device swingable in a substantially vertical plane, camming means actuatable by the ram and slidably engageable with said levers to rock said levers and move the tilting device through a portion of the travel of the latter, and an abutment portion also actuatable by the ram and operatively interconnectable with the levers to move the tilting device through a different portion of its travel.

12. Apparatus as defined in claim 10 wherein said camming means is engageable with and movable along a gradually inclined portion carried by each lever during the initial lifting portion of the movement of the tilting means.

13. Apparatus as defined in claim 11 wherein said camming means is engageable with and movable along a gradually inclined portion carried by each lever during the initial lifting portion of the movement of the tilting means, said abutment portion being movable to operatively engage and actuate said levers during a later portion of the lifting movement of said tilting means.

14. Apparatus as defined in claim 11 wherein said camming means is engageable with and movable along a gradually inclined portion carried by each lever during the initial lifting portion of the movement of the tilting means, said abutment portion being movable to operatively engage and actuate said levers during a later portion of the lifting movement of said tilting means, said levers and a container or other load on said tilting means moving over center during said later portion of the lifting movement whereby the angular direction in which the force of gravity acts on said levers is reversed, and automatic interlocking means providing a two-way driving connection between said abutment portion and levers during said later portion only of such lifting movement.

15. Material handling apparatus comprising a container having a ramming port therein and means for detachably securing an injecting and ramming device to said container, said ramming device including side walls defining the sides of a ramming chamber which is in substantial alignment with said port when said device is secured to said container, said chamber having a loading opening in the upper portion thereof, a ram reciprocable in said chamber toward and from said port, means on the ram for supporting a closure element for the port whereby the closure element can be moved by the ram from a position away from the port to a holding position across the port, closable access hatch portions carried by at least one of said side walls at a position away from the port and through which such closure means may be inserted for support on the ram when the ram is in position aligned with the hatch portions, and coacting means releasably carried by the container for fastening the closure element in the holding position with respect to the port and container to secure contents of the latter.

16. Material handling and compacting apparatus comprising a container having a ramming port therein, a separate injecting and ramming device, means for detachably securing said device to said container in alignment with said port, a ram forming a part of said device movable in a path extending from a position outside and spaced from said port through the port and into the container, said device having an open-topped combined receptacle and ram chamber through which said ram moves generally horizontally in traversing said path, ram actuating means, tilting means including a lifting element movable by said ram actuating means to lift and tilt collection containers or the like, to dump contents thereof into said chamber concurrently with retracting movement of the ram away from said port, and for lowering the container concurrently with movement of the ram in the opposite direction, said tilting means also including a lever on each side of said device swingable in a substantially vertical plane, and means for interrupting the driving connection between the ram and lifting element.

References Cited by the Examiner

UNITED STATES PATENTS

| | | | |
|---|---|---|---|
| 1,090,918 | 3/1914 | King et al. | 187—40 |
| 1,977,732 | 10/1934 | Mattler | 198—232 X |
| 2,108,548 | 2/1938 | Paxton | 100—57 |
| 2,928,562 | 3/1960 | Gollnick | 214—302 |
| 3,013,675 | 12/1961 | Schonrock | 214—41 |
| 3,015,407 | 1/1962 | Fesmire | 220—1.5 |
| 3,039,383 | 6/1962 | Windle et al. | 100—240 |
| 3,059,789 | 10/1962 | Bowles | 214—41 |
| 3,083,849 | 4/1963 | Mottin | 214—302 |
| 3,104,607 | 9/1963 | Galas | 100—53 |
| 3,125,947 | 3/1964 | Hubin | 100—53 |
| 3,129,657 | 4/1964 | Farley. | |
| 3,133,658 | 5/1964 | Freudman | 220—1.5 |
| 3,135,400 | 6/1964 | Tapp | 214—41 |
| 3,140,735 | 7/1964 | Windle et al. | 100—229 |

MARVIN A. CHAMPION, *Primary Examiner.*

GERALD M. FORLENZA, *Examiner.*

A. GRANT, *Assistant Examiner.*